United States Patent
Keskitalo et al.

[11] Patent Number: 6,128,486
[45] Date of Patent: *Oct. 3, 2000

[54] RECEPTION METHOD AND BASE STATION RECEIVER

[75] Inventors: Ilkka Keskitalo, Oulu; Matti Kiiski, Oulunsalo, both of Finland

[73] Assignee: Teknopolis Kolster Oy, Espoo, Finland

[*] Notice: This patent is subject to a terminal disclaimer.

[21] Appl. No.: 08/809,806

[22] PCT Filed: Jun. 28, 1996

[86] PCT No.: PCT/FI96/00383

§ 371 Date: Feb. 27, 1997

§ 102(e) Date: Feb. 27, 1997

[87] PCT Pub. No.: WO97/02666

PCT Pub. Date: Jan. 23, 1997

[30] Foreign Application Priority Data

Jun. 30, 1995 [FI] Finland ................................. 953276

[51] Int. Cl.[7] ................................. H01S 4/00; H04Q 7/00
[52] U.S. Cl. ........................ 455/422; 455/561; 455/437; 370/334; 370/335
[58] Field of Search ................................. 455/561, 562, 455/57, 67.6, 62, 63, 422, 437; 370/334, 335

[56] References Cited

U.S. PATENT DOCUMENTS

| | | | |
|---|---|---|---|
| 4,516,269 | 5/1985 | Krinock | 455/51 |
| 5,127,025 | 6/1992 | Okanoue . | |
| 5,134,715 | 7/1992 | Parl et al. | 455/64 |
| 5,235,612 | 8/1993 | Stillwell et al. | 375/1 |
| 5,307,517 | 4/1994 | Rich | 455/306 |
| 5,602,555 | 2/1997 | Searle et al. | 342/374 |
| 5,774,808 | 6/1998 | Sarkioja et al. | 455/436 |
| 5,893,033 | 4/1999 | Keskitalo et al. | 455/437 |

FOREIGN PATENT DOCUMENTS

| | | |
|---|---|---|
| 654 915 | 5/1995 | European Pat. Off. . |
| 93/12590 | 6/1993 | WIPO . |

OTHER PUBLICATIONS

Patent Abstract of Japan, Abstract of JP,A,7–143102 (Miyoshi Denki K.K.), Jun. 2, 1995.

IEEE Vehicular Technology conference, vol. No. 43, May 1993 (NJ,USA), T.Aubrey et al, "A Comparison of Switched Pattern Diversity Antennas", pp. —89–92.

EIA/TIA IS–95 (relevant pages ) Combination of an Adaptive Array Antenna and a Canseller of Interference for Direct–Sequence Spread–Spectrum Multiple–Access System by R. Kohno et al (IEEE J–SAC,vol.8,4,pp. 675–682, May 1990).

*Primary Examiner*—Wellington Chin
*Assistant Examiner*—Sheila B. Smith
*Attorney, Agent, or Firm*—Pillsbury Madison & Sutro, LLP

[57] ABSTRACT

A base station receiver and a reception method in a CDMA cellular radio system includes, in each cell, at least one base station communicating with a plurality of mobile stations situated within its area. The base stations measure the direction angle of a signal arriving from each mobile station with respect to the base station, and communicate with the mobile stations using antenna beams that change in time. The angles of the greatest gain of the beams are adjusted according to signal components arriving from the mobile station. In order to provide detection of good quality without a great deal of calculation, the detection of the desired signal utilizes simultaneously several signals received from different mobile stations taking into account the incoming direction of the signals when selecting the signals.

14 Claims, 7 Drawing Sheets

RECEPTION METHOD AND BASE STATION RECEIVER

The invention relates to a reception method in a CDMA cellular radio system comprising each cell at least one base station communicating with mobile stations located within its area, which base stations measure the direction angle of a signal arriving from each mobile station with respect to the base station, and which base stations transmit and receive the signals of the mobile stations by means of an antenna array consisting of several elements by phasing the signal to be transmitted and received so that the gain obtained from the antenna array is the greatest in the desired directions.

Code division multiple access (CDMA) is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning. An example of a known CDMA system is disclosed in the ETA/TIA Interim Standard: Mobile Station-Base Station Compatibility Standard for Dual-Mode Wideband Spread Spectrum Cellular System, TIA/EIA/IS-95, July 1993, EIA/TIA IS-95.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the different users can be distinguished from one another in the receivers on the basis of the spreading code of each user.

Matched filters provided in the receivers are synchronized with a desired signal, which is recognized on the basis of a spreading code. The data signal is restored in the receiver to the original band by multiplying it again by the same spreading code that was used during the transmission. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. CDMA differs from the conventional FDMA and TDMA in that the multipath propagation can be exploited in the reception of the signal. The receiver generally utilized in a CDMA system is a multibranch receiver structure where each branch is synchronized with a signal component which has propagated along an individual path. Each branch is an independent receiver element, the function of which is to compose and demodulate one received signal component. In a conventional CDMA receiver, the signals of the different receiver elements are combined advantageously, either coherently or incoherently, whereby a signal of good quality is achieved.

Interference caused by other connections in the desired connection thus appears in the receiver as noise that is evenly distributed. This is also true when a signal is examined in an angular domain according to the incoming directions of the signals detected in the receivers. The interference caused by the other connections in the desired connection thus also appears in the receiver as distributed in the angular domain, i.e. the interference is rather evenly distributed into the different incoming directions.

The multiple access interference of the CDMA systems can also be reduced by means of different known multiple access interference cancellation (IC) methods and multi-user detection (MUD). These methods are best suited for reducing the interference produced within the user's own cell, and the system capacity can thus be increased to about a double compared to a system implemented without interference cancellation. However, the IC/MUD techniques are complicated to realize due to the large amount of calculation, especially when the number of the signals increases.

Another alternative is to try to restrict the interference cancellation or the multi-user detection only to a certain number of signals, whereupon the rest of the interfering signals constitute co-channel interference. Such a method is an SDMA (Space Division Multiple Access) method wherein the users are distinguished from one another on the basis of their location. This is performed in such a way that the beams of the receiver antennas are adjusted in the base station to the desired directions according to the location of the mobile stations. For this purpose, the system uses adaptive antenna arrays, i.e. phased antennas, and the processing of the received signal, by means of which the mobile stations are tracked. The adaptive changing of the directivity pattern of an antenna or an antenna array can be realized with a technique known to a person skilled in the art, for example by phasing the signal received by the antennas in such a way that the sum signal corresponds to the desired directivity pattern. The phasing can be provided for example with adaptive filtration, which may also take place on the baseband.

*Combination of an Adaptive Array Antenna and a Canceller of Interference for Direct-Secuence Spread-Spectrum Multiple Access System* by R. Kohno, H Imai, M. Hatori and S. Pasupathy (*IEEE J-SAC,* Vol 8, No. 4, pp. 675–682, May 1990), which is incorporated herein by reference, discloses a prior art arrangement where the interference cancellation is applied in connection with adaptive antennas. However, in the arrangement described therein, the amount of calculation is significant since the interfering signals are not subjected to any kind of selection, but only to weighted subtraction.

The purpose of the present invention is to realize a method and a receiver by means of which the capacity provided by the prior methods can be improved further without an increase in the amount of calculation. The purpose of the method according to the invention is to simplify the baseband processing in the interference cancellation and in multi-user detection and thus to improve the capacity or sensitivity of the detector.

This is achieved with a method of the type described in the preamble, characterized in that the detection of the desired signal utilizes simultaneously signals received from several mobile stations, the incoming direction of the signals being taken into account when selecting the signals.

The invention also relates to a base station receiver comprising an antenna array consisting of several elements, a group of radio-frequency units connected to the antenna array, a group of detector means which means comprise a number of filters and signal detectors adapted to the signal to be received, and means for phasing the received signal so that the gain obtained from the antenna array is the greatest in the desired directions. The base station according to the invention is characterized in that the receiver comprises first detector means the input of which comprises a signal from the radio-frequency parts, which means perform preliminary estimation on the received signal components, and a switching matrix the input of which comprises a signal from the first detector means and second detector means the input of which comprises a signal from the radio-frequency parts and the output signal of the switching matrix, which means perform the signal detection and estimation by utilizing a number of signal components received from the different terminal equipments, and control means which select and guide, by means of the switching matrix, the signals to be utilized on the basis of their incoming direction from the first detector means to the second detector means.

With the method according to the invention, it is possible to use both adaptive antenna beams and methods of interference cancellation and multi-user detection in such a way that especially processing that takes place on the baseband can be realized in practice without a great deal of calculation. In an arrangement according to the preferred embodiment of the invention, it is possible to use for interference cancellation signals that have been received from other terminal equipments, that have already been detected and that interfere with the desired signal.

The method according to the invention can be applied in a system where adaptive antenna beams are provided by means of either analog or digital phasing.

In the following, the preferred embodiments of the invention will be described in greater detail with reference to the examples according to the accompanying drawings, in which.

Figure 1:
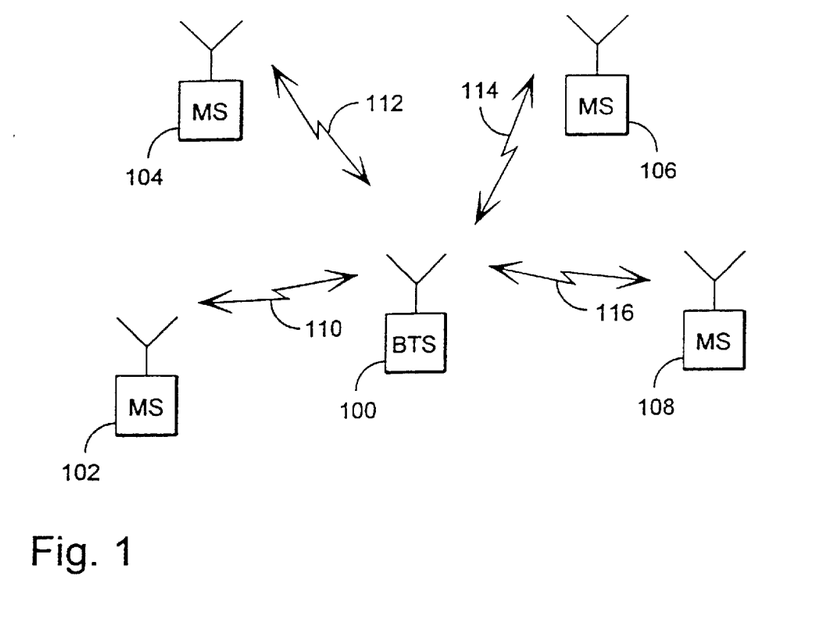
FIG. 1 illustrates a cellular radio system where the method according to the invention can be applied.

FIG. 1 illustrates a CDMA cellular radio system where the method according to the invention can be applied. The system comprises in each cell at least one base station 100 and a number of subscriber equipments 102 to 108 each of which communicates 110–116 with the base station. A characteristic feature of the CDMA is that all the terminal equipments use the same frequency band for communicating with the base station, and the channels between them are distinguished from one another on the basis of the spreading code used over each connection. The same frequency band can also be used in adjacent cells.

Figure 2:
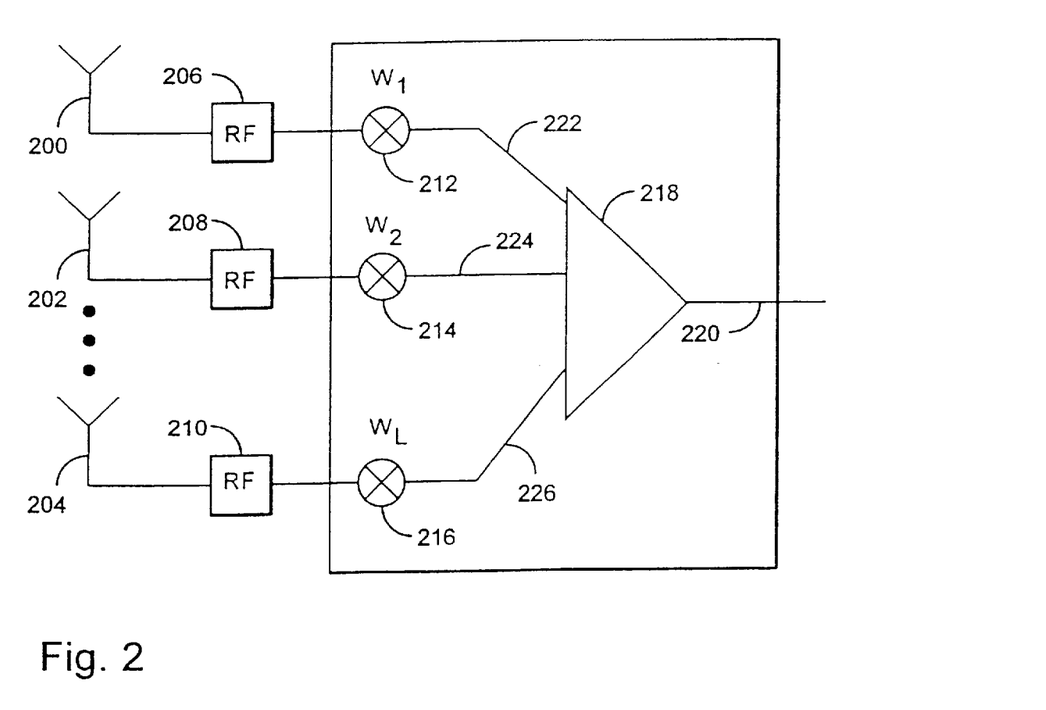
FIG. 2 illustrates a possible implementation of an adaptive antenna array.

The system according to the invention applies in the base station antenna beams that change in time and that can be realized for example by means of adaptive antenna arrays. An adaptive antenna array is an antenna group consisting of several different elements FIG. 2 illustrates a possible implementation of an adaptive antenna array. The antenna array comprises L antenna elements 200, 202, 204, which may be for example omnidirectional antennas. Each antenna element is connected to radio-frequency parts 206, 208, 210, which convert the received signal into an intermediate frequency and sample the signal into (I,Q) components according to known technology. The obtained complex samples are then multiplied by the corresponding complex weighting coefficients $w_i$, wherein i=1, . . . L, in multipliers 212, 214, 216. The samples 222, 224, 226 that have thus been multiplied are applied via an adder 218 to other parts of the receiver.

The complex weighting coefficients $w_i$ are selected according to an algorithm, which is usually adaptive, in such a way that an antenna pattern of the desired shape is achieved. This manner of shaping the received signal can be called digital phasing of the signal, since it is performed on a signal digitized on the baseband, but due to this shaping the received signal antenna gain can be oriented in the desired directions. An antenna array as such may comprise either directional or omnidirectional antenna elements. Phasing the signal obtained from the different antennas and combining the phased signals produces kind of virtual antenna beams into the desired directions.

It is not essential in the present invention how the antenna beams changing in time are realized in the base station, and the above-described method is only intended as an illustrative example. Examine below the method according to the invention first in applying interference cancellation and the digital phasing to be performed on the baseband. Digital phasing and multi-user detection will be examined separately further on.

Figure 3:
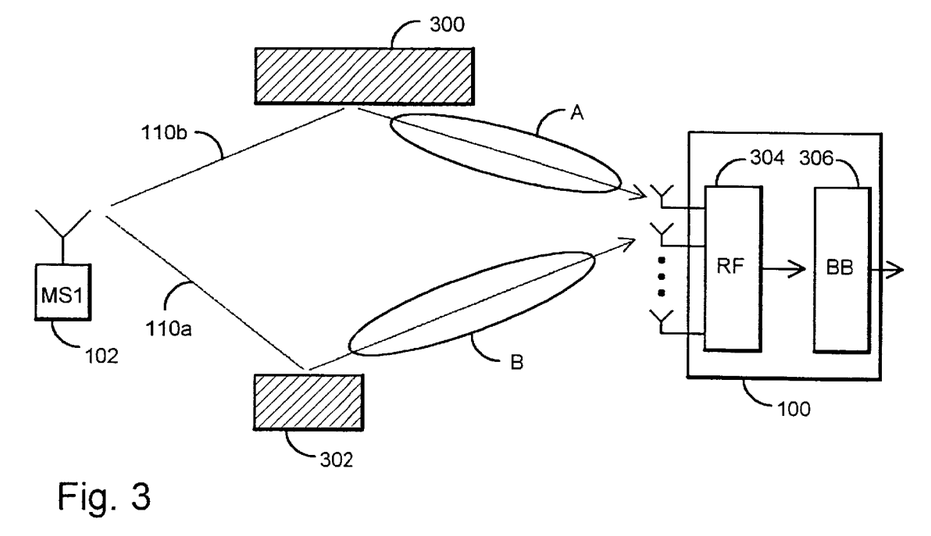
FIG. 3 illustrates the first example of oriented antenna beams in case of one terminal equipment.

FIG. 3 illustrates an example of a situation where the base station 100 that comprises radio-frequency parts 302 and baseband parts 304 communicates with a terminal equipment 102 situated within its area, and where the base station reception is already adapted to a signal arriving from the terminal equipment 102. In this example as in the description below, it is assumed without restricting the generality that the base station utilizes in reception the two strongest multipath-propagated signal components. This ensures the advantages of antenna diversity and prevents the worst Raleigh-distributed fading situations where the entire band of the signal fades simultaneously, which is possible with one signal component.

In the example of FIG. 3, it is also assumed that the two most significant signal components 110a and 110b of the signal transmitted by the terminal equipment arrive reflected from two obstacles 300, 302 in the terrain. The base station receives each signal component 110a, 110b with a separate oriented antenna beam A and B. This requires duplex logic used for phasing the signal in order to obtain two separate and mutually independent oriented antenna beams. The base station 100 maintains for each connection 110a, 110b and antenna beam A, B information about the signal phasing, which corresponds to an absolute incoming direction of signal. This data is utilized later when the interference caused by the other users in the received signal is estimated.

The signal transmitted by the base station is phased for each connection to correspond to a radiation pattern to which the reception is adapted. In this manner, the quality of the signal received by the terminal equipment is also improved. This can be applied under circumstances where the channel is reciprocal, i.e. the signal propagates in the same way in both transmission directions.

Figure 4:
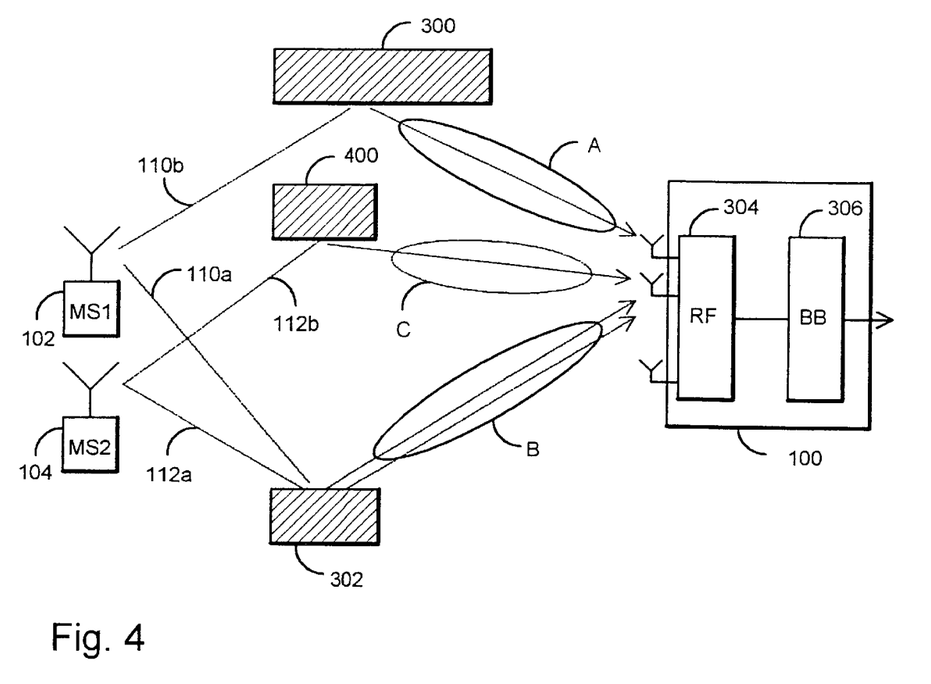
FIG. 4 illustrates a second example of oriented antenna beams in case of two terminal equipments.

FIG. 4 illustrates an example of a situation where the base station 100 communicates with two terminal equipments 102 and 104 situated within its area. In the same way as above, two signal components 110a, 110b and 112a, 112b, respectively, are taken into account from each terminal equipment. In the example of the figure, the signal components 112a, 112b of the terminal equipment 104 are reflected from the obstacles 302, 400 situated in the terrain in such a way that one component 112a arrives at the base station from the same direction as one of the signal components 110a of the terminal equipment 102 and arrives at the area of the same antenna beam B. In the reception of signals in each terminal equipment, the signal transmitted by the other equipment is visible as interference, since the antenna beams do not suppress the interfering signal.

In such a situation, the idea of the invention is to use in the base station the signals of the terminal equipments 102, 104 that have already been detected for mutually improving the capacity. The interfering signal is not an unknown signal, but it has already been detected once in the first detector means of the receiver, which will be described in greater detail below, and the interfering signal can be cancelled from the desired signal so that the sensitivity of the receiver is improved. The operation of the receiver will be described in greater detail further on.

Figure 5:
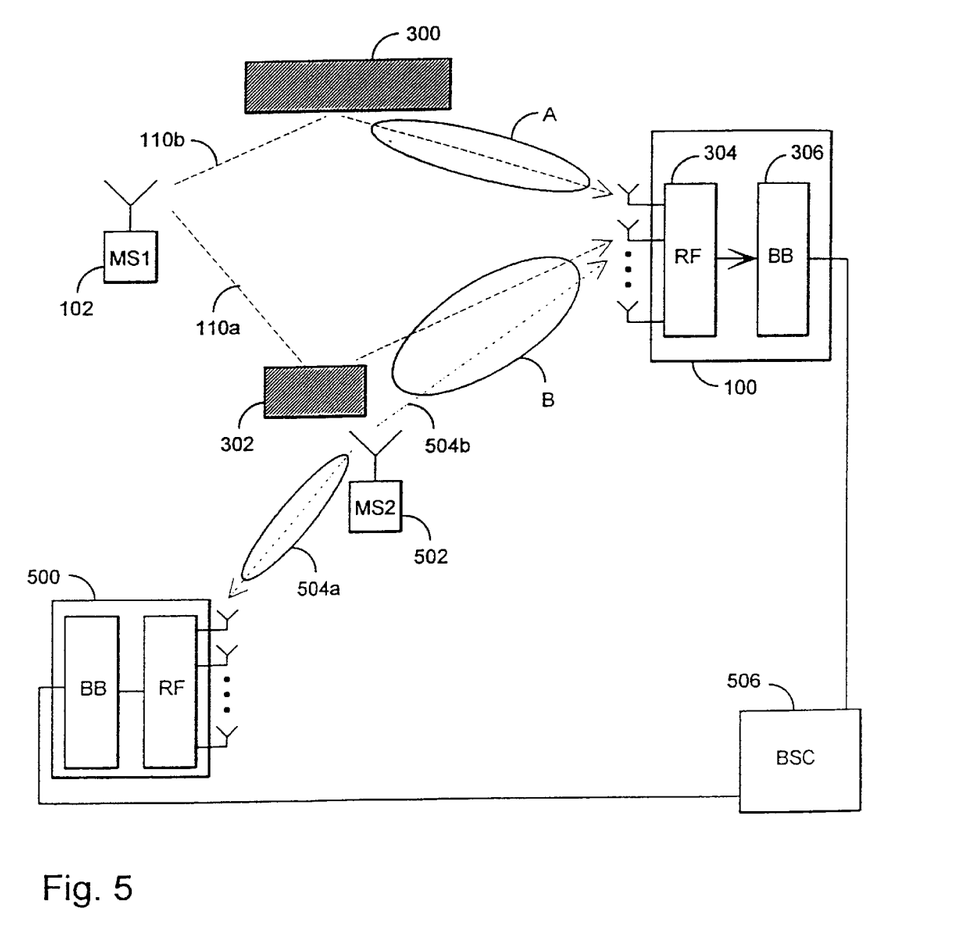
FIG. 5 illustrates a third example of oriented antenna beams in case of two terminal equipments that are situated in different cells.

FIG. 5 illustrates an example of a situation where the base station 100 communicates with a terminal equipment 102 situated within its area. The figure also shows a base station 500 servicing the neighbouring cell and a terminal equipment 502 communicating 504a with the base station, and a base station controller 506 with which both base stations communicate. In the example of the figure, the signal 504b from the terminal equipment 502 also arrives at the base station 100 from the same direction covered by the beam B as the signal component 110a from the terminal equipment 102. The signal 504b is visible at the signal reception of the terminal equipment 102 as noise, since the antenna beams do not suppress the interfering signal.

In this case, the aforementioned interfering signal 504b is not detected in the same base station 100 as the desired signal 110a, since the terminal equipment 502 does not communicate with the base station 100 but with the base station 500. The signal 504b is therefore not a known signal. The interfering terminal equipment 502 and the channel it uses can be indicated to the base station 100 via the base station controller 506. The base station 100 can then activate an additional receiver to receive the aforementioned interfering signal, and the signal which has thus been detected can be used in the reception of the other signals in the same way as any other signal received by the base station 100.

In the preferred embodiment of the invention, informing the neighbouring base station of the parameters of the interfering terminal equipment is connected to the updating of the handover algorithm. In the cellular radio system according to the invention, the terminal equipments measure at times the quality of the signal they have received from their own base station and from the surrounding base stations and report the measurement results to their own base station, which forwards the results to the base station controller. It is possible to deduce from the measurement results, by comparing the obtained quality value to the threshold values given, when the terminal equipment interferes with the adjacent base station and when a handover from one base station to another can be performed most advantageously.

In the situation illustrated in FIG. 5, the terminal equipment 504 performs the above-described measurements from the signals it has detected from the base stations 500 and 100 and reports the results of the measurements to the base station 500, which forwards the results to the base station controller 506. On the basis of the measurement report, the measurement of the interfering channel is activated in the base station 100. The measurement is performed with a normal channel unit and it is possible to add thereto the adaptivity of the antenna beams, so that the cancellation of the interference caused can be directed only to channels received from certain directions.

In addition to advantageous interference cancellation, the method described above has the advantage that it enables a handover margin in the CDMA network, since interference produced in the neighbouring cell can be eliminated.

The method described above also has the advantage that the base station 100 is already synchronized with the signal from the terminal equipment 502 so that if the terminal equipment possibly moves towards the base station 100, a possible handover can be performed rapidly. In the arrangement according to the invention, it is sufficient that the base station 100 starts transmitting the information of the detected channel 504b to the base station controller 506 while the base station controller 506 activates the base station 100 to transmit a signal intended for the terminal equipment 502 and deactivates the transmission of the base station 500. If required, the base station 500 can be made to continue monitoring the signal from the terminal equipment 502 that performed the handover or the purpose of interference cancellation. It is not necessary, however, since the terminal equipment 502 is already situated at a distance corresponding to the handover margin from the area covered by the base station 500.

There are also other alternatives for informing the neighbouring base station of the parameters of the interfering terminal equipment. In cell design, it is possible to locate the places and directions where terminal equipments are more likely to cause interference to the other base stations. In the example of the figure, the base station 50 can measure the location of the terminal equipments on the basis of the direction of the antenna beam and the distance information obtained from the propagation delay of the signal. The corresponding directions of interference must be determined from the point of view of the base station 100, so that the indicated interfering signal can be taken into account in the detection of the signals arriving from the aforementioned directions. The directions are indicated by means of phase vectors. One of the most probable directions is naturally the direct line between the base stations.

In the following, it can be assumed without restricting the generality that the interfering signal arrives from the area of the same base station as the desired signal, i.e. the terminal equipment in question is a terminal equipment with which the base station communicates.

Figure 6:
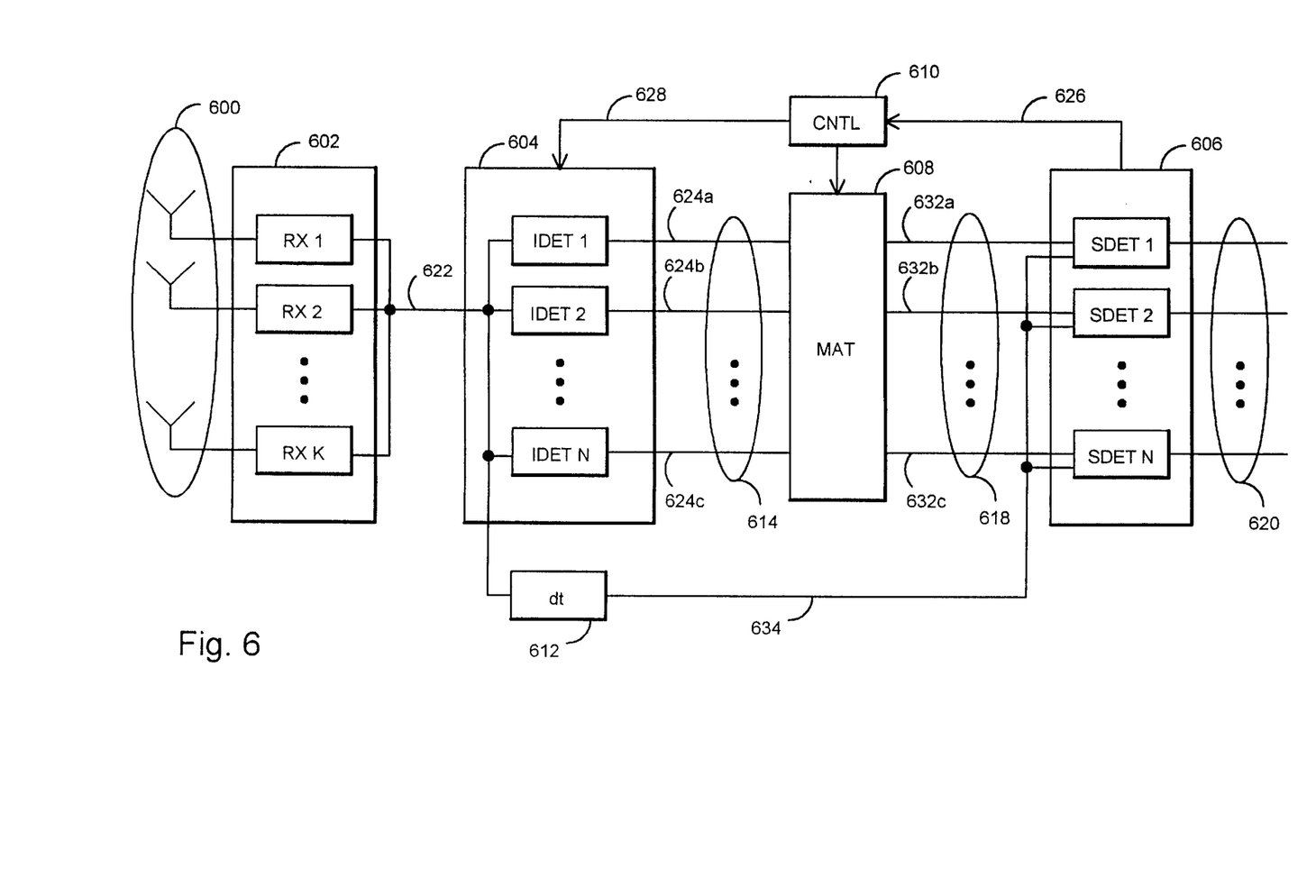
FIG. 6 is a block diagram illustrating an example of the structure of a receiver according to the invention.

Examine next the structure and operation of a receiver according to the invention by means of the block diagram shown in FIG. 6.

FIG. 6 shows the receiver structure of the base station, capable of receiving N users. The receiver comprises K antenna elements 600. Each antenna element has its own radio-frequency front part 602 where a carrier-frequency signal is down-converted and filtered with known methods. All the K signals 622 are supplied to first detector means 604 the number of which is N. In the first detector means 604, the received signals are subjected to preliminary detection in order to estimate the interference caused by each signal The detector means 604 are only activated in a number that corresponds to the number of the active users within the cell area. The detected signal is weighted and phased to correspond to two multipath signals or interfering signals. Each output 624a to 624c of the detector thus comprises two components in the example of the figure. It should be mentioned in this connection that in this example it is assumed that in the base station two components are utilized from the received signals, but the invention can also be applied correspondingly with other numbers of detected signals, two being only an example. The aforementioned interfering signals 614 are supplied to a cross-connection matrix 608 via which the signals 618 are applied to second detector means 606. The down-converted K signals 634 are also supplied to the input of the detector means 616 via a delay means 612. The delay of the delay means 612 is set to correspond to the processing delay of the first detector means 604 so that the interfering signal detected in the input of the second detector means 606 and the down-converted signal received from the radio channel are in the right stage in time.

The interfering signals to be connected to each detector means are selected in the method according to the invention on the basis of their incoming directions and signal strengths. The receiver comprises a control unit 610 controlling the operation of the different blocks, and the connection is performed by the control unit 610. The second detector means 606 perform the phasing of the received signals, and the information 626 about the performed phasing is applied to the control unit 610. The control unit 616 forwards the phasing information 628 to the corresponding first detector means 604 by means of which this data is updated in the first detector means. The first detector means 604 do not therefore perform themselves the calculation for phasing the beams, but they utilize the information obtained in the second detector means 606.

The cross-connection matrix 608 is realized in the same way as a conventional prior art matrix and its operation is controlled by the control unit. The strongest signal of the signals transmitted by some other terminal equipment is selected as the interfering signal for each direction. In this way, the strongest interference can be cancelled and the rest of the interference is to be removed by the detection amplification of the receiver. It must be noted that since most of the interference can be cancelled by the antenna beams, it is probably sufficient that only the most interfering signal is removed from each direction on the baseband.

In the example, two multipath components are used in the detection of each channel, wherefore two interfering signals are supplied to each of the second detector means 606. Each output 632a to 632c of the cross-connection matrix thus contains two components. The control unit 610 should therefore deduce the most interfering signal for both antenna beams of each second detector means. The control of the switching matrix 608 does not require especially fast processing, since the rate thereof is only dependent on the movements of the terminal equipments and sudden changes are not probable.

The outputs of the second detector means 606 provide the detected user signals 620. The number of the stages in the receiver can be increased, if required, so that the aforementioned detected signals 620 are new and more accurate estimates of the interfering signals that are used for more accurate interference cancellation in the next stage of the receiver. In the same manner, the determination of the phasing of the signals can be transferred to be performed in the signal that has been detected in a more reliable manner in the last stage.

Figure 7:
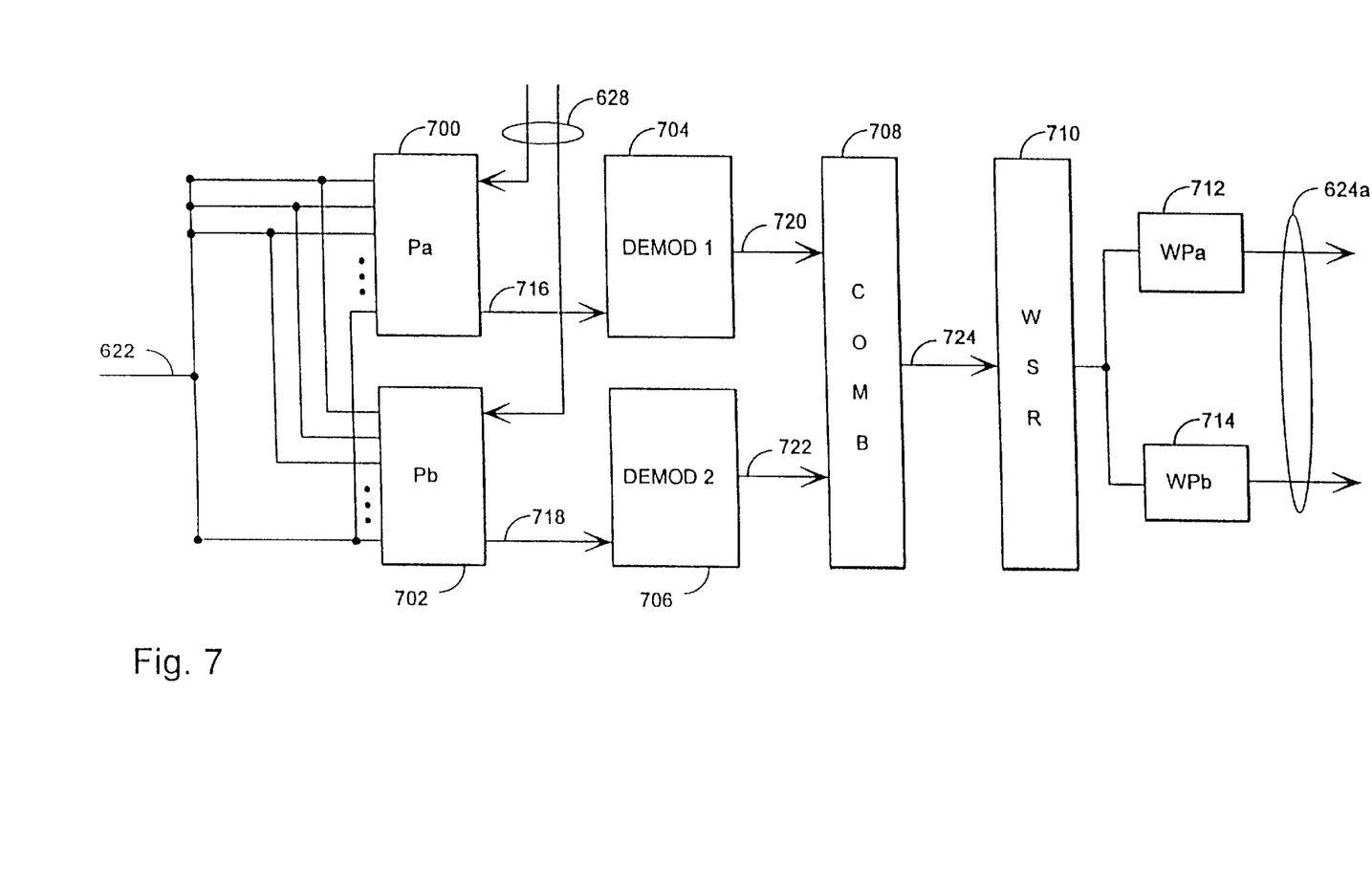
FIGS. 7 and 8 are block diagrams illustrating in greater detail the structure of a receiver according to the invention.

Examine below in greater detail the structure of the first detector means 604 by means of the block diagram of FIG. 7. The figure shows an example of the basic structure of the first detector means performing the preliminary estimation.

The detector means comprises phasing means 700, 702 to the input of which down-converted signals 622 are supplied from each radio-frequency means. In the phasing means, the signals are phased and summed so that amplified signals 716, 718 can be provided in the output to the desired directions. The phasing of the signals corresponds to two different antenna directivity patterns. The phasing, which can be realized as complex multiplication, is controlled 628 by the second detector means 606 either directly or via the control unit 610. The phased signals are supplied to detector units 704, 706 from where the broadband signal is composed to the information channel. The composing uses the spreading code of the connection that is used for correlating the incoming signal according to known technology.

The detected signals 720, 722 are supplied to a diversity combiner 708 where the multipath signals arriving from two different directions are combined. The diversity combination may be either coherent or incoherent, the latter being more probable in connection with a base station. In the diversity combiner, a hard decision is made on the information signal, and the signal 724 obtained in this way is supplied further to signal regeneration means 710 where the signal is multiplied again by the spreading code into a broadband signal. The obtained broadband signal is supplied to weighting means 712, 714 where the regenerated signal is weighted and delayed to correspond to the actual interfering signal having the correct stage for interference cancellation.

If the reliability of the detection of the interfering signal is to be improved further, the possible channel coding can also be decoded in the first detector means 604. In such a case, the signal regeneration means 710 would also comprise the recoding of the signal in addition to the spectral spreading. This naturally increases the processing delay.

Figure 8:
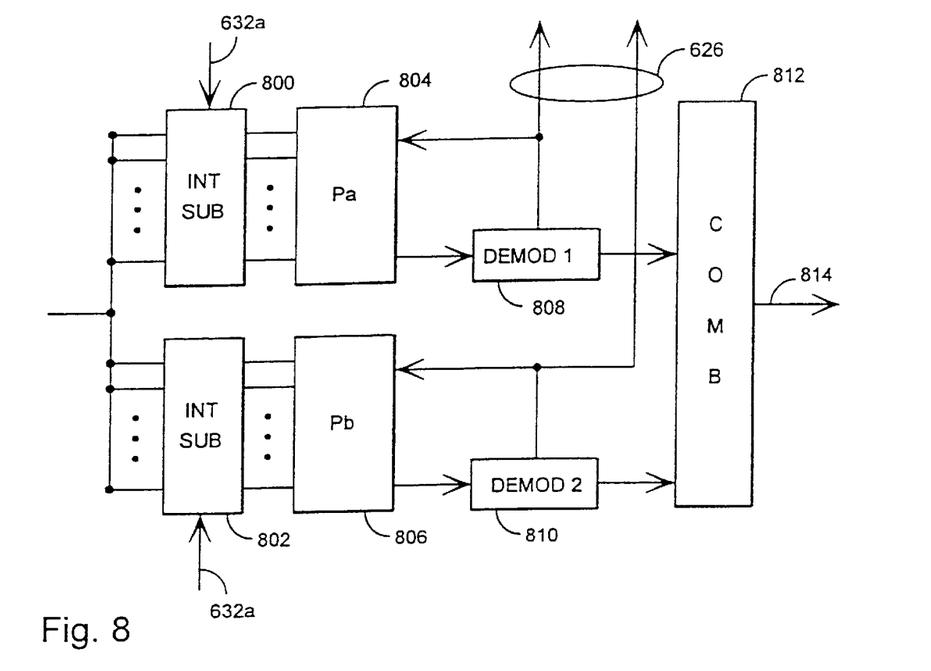
Figure 9:
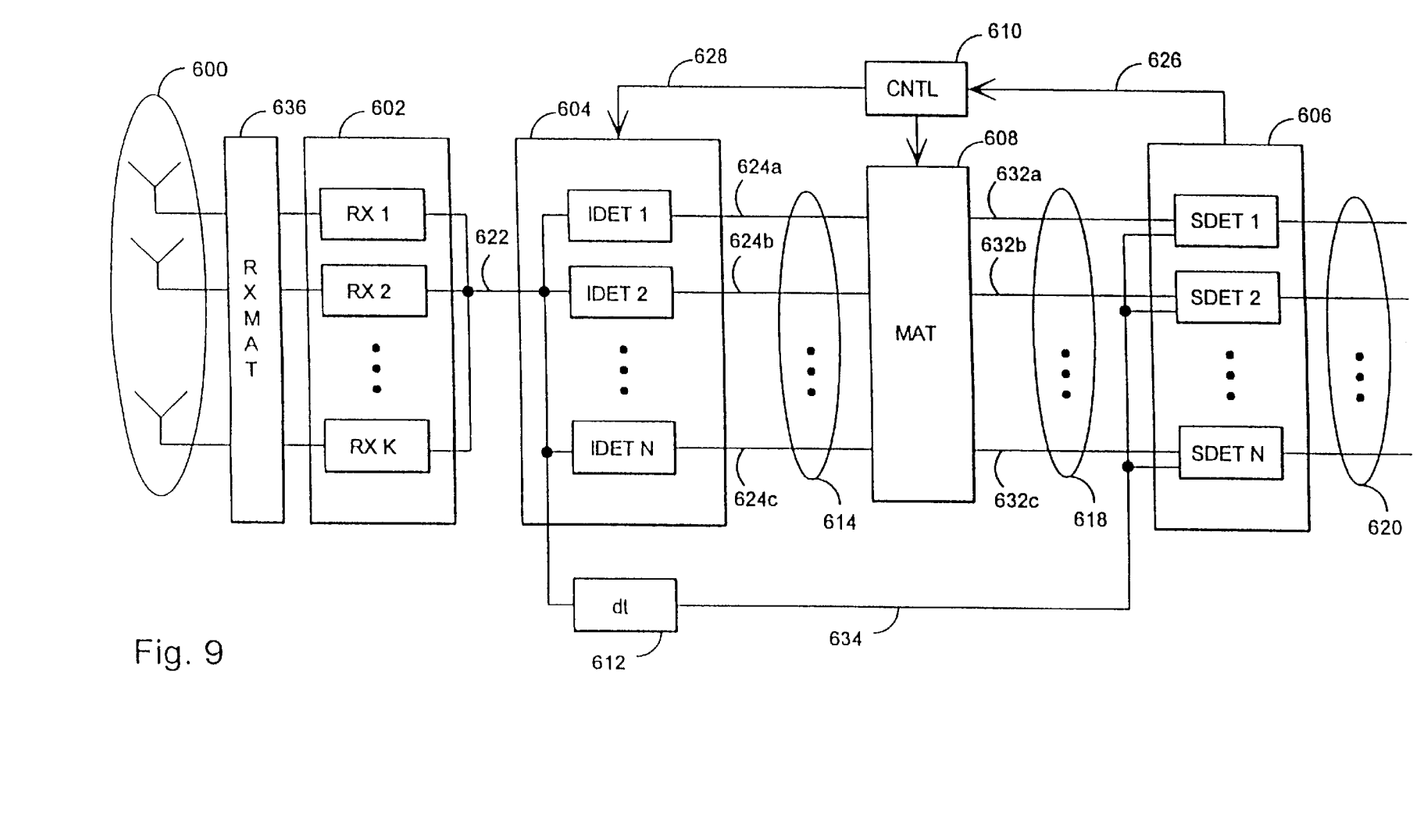
FIGS. 9 and 10 are block diagrams illustrating the structure of a receiver according to the invention when using analog phasing.

Examine below in greater detail the structure of the second detector means 606 by means of the block diagram of FIG. 8. The figure shows an example of the basic structure of the second detector means performing the actual detection.

The input of the second detector means consists of the delayed K down-converted signals 634 from the K antenna receivers and the detected and regenerated interfering signals 632a. The detector means comprise two separate diversity branches. In each branch, interference cancellation is first performed in means 800, 802 where the regenerated interfering signal supplied via the cross-connection matrix is subtracted from the incoming signal. The interference cancellation can be performed by prior art methods. The signal cleared of interference is supplied to phasing means 804, 806 and to demodulation and detection means 808, 810. In the demodulation and detection means, the phased signal is composed and demodulated, and the phasing is controlled by a suitable algorithm the purpose of which is to optimize the effective radiation beam of the antenna separately for each signal component. The phasing data and the detected radiation power 626 are transmitted to the first detector means 604 either directly or via the control unit 610.

The signal phasing algorithm may be in its simplest form only a method that determines the direction of the main beam but that does not directly try to form dips in the direction of the interfering signals. This is on average sufficient in the CDMA network since the co-channel interference is averaged and single sources of interference are difficult to distinguish. The algorithm removing the interference can be realized for example with an adaptive FIR filter having coefficients that are updated daily for example with an LMS algorithm.

The signals are detected in the detector means 808, 810 separately in each branch and supplied further to the diversity combiner 812 which also in this case may be either a coherent or incoherent combiner. The combined signal 814 is ready for decision-making and further for channel decoding, which can be implemented by conventional methods.

Examine below the method according to the invention when applying analog phasing. The basic idea of the invention is independent of the phasing used, but the structures of the receiver in different embodiments differ slightly from one another. FIG. 6 shows the receiver structure of the base station with which N users can be received. The receiver comprises K antenna elements 600. The antenna elements 600 are connected to an RX matrix which performs phasing on the analog signal which has been received by the antenna elements in such a way that the matrix output comprises K signal outputs each of which corresponds to a signal received by an antenna beam pointing in a predetermined signal incoming direction. The matrix can be implemented by means of prior art arrangements, such as a Butler matrix that is realized with passive 90° hybrids and phase shifters. The number of the antenna beams produced with the matrix does not necessarily correspond to the number of the antenna elements.

The matrix output signals are supplied to the radio-frequency front parts 602 which are provided separately for each antenna beam and where the carrier-frequency signal is down-converted and filtered by known methods. All the K signals 622 are supplied to the first detector means 604 the number of which is N. In the first detector means 604, preliminary detection is performed on the received signals in order to estimate the interference caused by each signal.

Examine below in greater detail the structure of the first detector means 604 in connection with analog phasing by means of the block diagram of FIG. 7.

Instead of the above-described phasing means, the detector means comprises in this case switching means 700, 702 to the input of which the down-converted signals 622 from each radio-frequency means are supplied, and which signals correspond to the components received by the different antenna beams. In the switching means, the antenna beam receiving the desired signal is selected. The control 628 to the switching means 700, 702 arrives from the second detector means 606 either directly or via the control unit 610. The selected signals are supplied to the detector units 704, 706 where the broadband signal is composed to the information band. The composing utilizes the spreading code of the connection that is used to correlate the input signal according to known technology. In other respects, the structure of the first detector means 604 is similar to what is described above in connection with digital phasing.

Figure 10:
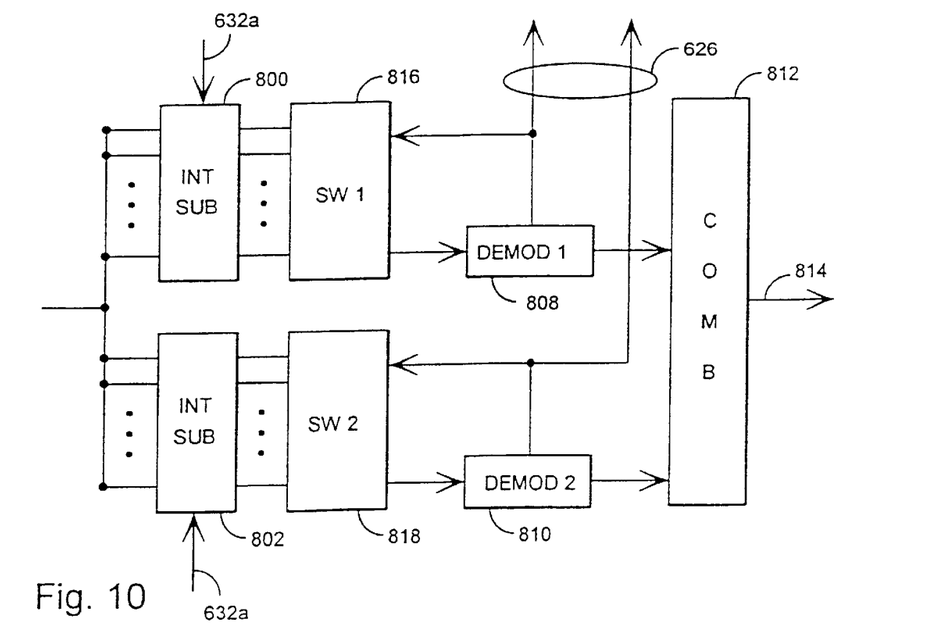

Examine below in greater detail the structure of the second detector means 606 in connection with analog phasing by means of the block diagram of FIG. 10. The figure shows an example of the basic structure of the second detector means performing the actual detection.

The input of the second detector means consists of the delayed K down-converted signals 634 from the K antenna receivers and the detected and regenerated interfering signals 632a. The detector means comprise two separate diversity branches. In each branch, interference cancellation is first performed in the means 800, 802 where the regenerated interfering signal supplied via the cross-connection matrix is subtracted from the incoming signal. The interference cancellation can be performed by prior art methods. The signal cleared of interference is supplied to the switching means 816, 818 and to the demodulation and detection means 808, 810. In the switching means 816, 818, the signal received by the desired antenna beam is selected as described in connection with the first detector means. In the demodulation and detection means, the selected signals are composed and demodulated, and the switching means 816, 818 are controlled with a suitable algorithm. The information about the control of the switching means and the detected radiation power 626 are transmitted to the first detector means 604 either directly or via the control unit 610. In other respects, the structure of the detector means 606 is similar to what is described above in connection with digital phasing.

Examine below the method according to the invention when applying multi-user detection instead of interference cancellation. The basic idea of the invention is applicable, as mentioned above, for both of the aforementioned cases and for both of the phasing methods described above.

Examine below FIG. 6. In multi-user detection, the receiver operates essentially as described above, excluding the operation of the second detector means 606. In the first detector means 604, the preliminary estimation of the signals is performed, and the signals received from the same direction are supplied to the second detector means 606 via the matrix 608 as described above. In the second detector means, the signals received from the same direction are subjected to simultaneous detection, whereupon all the information that arrives can be utilized according to the principles of simultaneous detection. The detection can be performed by methods known to a person skilled in the art, and the detection method as such is not essential for the invention. The more detailed structure of the second detector means 606 differs from the above-described structure and it is dependent on the detection method used, as it is clear for a person skilled in the art. In the output 620 of the second detector means, the output signal of each means comprises in this case the detected signal of one or more users depending on how many users have been detected in each means.

Even though the invention is described above with reference to the example according to the accompanying drawings, it is clear that the invention is not restricted thereto, but it can be modified in many ways within the scope of the inventive idea disclosed in the appended claims.

What is claimed is:

1. A reception method in a CDMA cellular radio system, comprising:

in each cell, at least one base station communicating with a plurality of mobile stations located within its area, said base station measuring a direction angle of a signal arriving from each said mobile station to said base station, said base station transmitting and receiving signals of said mobile stations by an antenna array by phasing a signal to be transmitted and received so that a gain obtained from said antenna array is largest in a desired direction, said antenna array comprising several elements, wherein detection of a desired signal uses simultaneously, signals received from said plurality of mobile stations, an incoming direction of said signals being taken into account when selecting said signals.

2. The method according to claim 1, wherein detection of said desired signal uses simultaneously, significant signals that arrive from the same direction as said desired signal.

3. The method according to claim 1, wherein said base station removes signal components interfering with said desired signal from a received transmission, when interfering signals are being removed from each said desired signal, said incoming direction and strength of said interfering signals are taken into account, and that significant signals which arrive from said same direction as said desired signal, are selected for removal from said desired signal.

4. The method according to claim 3, wherein interference cancellation of said signal received from said mobile station uses signals that have been received from said other mobile stations and that have already been detected.

5. The method according to claim 3, wherein said mobile stations measure a quality of a signal received from their own base station and from surrounding base stations, and report measurement results via their own base station to a base station controller, said base station controller detects, based on said measurement results, when interference caused by transmission from a particular mobile station of said surrounding base stations exceeds a given threshold, and when measurement of said interfering channel is started in said surrounding base stations, and said base station controller informs said base station surrounding said desired signal of parameters concerning said interfering signal, said base station activates a receiver to indicate said interfering signal for interference cancellation.

6. The method according to claim 3, wherein received radio-frequency signals are converted into an intermediate frequency, at least one interfering signal arriving from said direction of said desired signals is detected from said signal, and said at least one interfering signal is combined, modulated, and weighted with directional and weighting coefficients and supplied to said desired signal detector where interference cancellation is performed before said desired signal is detected.

7. A base station receiver, comprising:

an antenna array comprising several elements;

a plurality of radio-frequency units connected to said antenna array;

a plurality of detectors, said detectors comprising a plurality of filters and a plurality of signal detectors adapted to a signal to be received;

a phaser which phases said received signal so that a gain obtained from said antenna array is largest in said desired direction;

a first detector which performs preliminary estimation on received signal components, an input to said first detector being a signal from said radio-frequency units;

a switching matrix, an input to said switching matrix being a signal from said first detector, a second detector which performs signal detection and estimation by using a plurality of signal components received from different terminal equipment, an input to said second detector being a signal from said radio-frequency units and output signal of said switching matrix; and a controller which selects and guides, by said switching matrix, signals to be used based on their incoming direction from said first detector to said second detector.

8. The base station receiver according to claim 7, further comprising:

an estimator which removes interfering signals from said desired signal and estimates, and a controller which guides, by said switching matrix, said interfering signals to be removed from said first detector to said second detector.

9. The base station receiver according to claim 8, wherein said second detector comprises at least one remover which removes a signal interfering with said desired signal from said received signal, at least one phaser which phases said received signal so that said gain obtained from said antenna array is largest in said desired direction, at least one demodulator which demodulates said desired signal, and a combiner which combines said demodulated signals.

10. The base station receiver according to claim 9, wherein said second detector comprises at least one calculator which calculates a direction where said gain obtained from said antenna array is largest, and a transmitter which transmits information about said direction to said phaser and said controller.

11. The base station receiver according to claim 7, wherein said first detector comprises at least one phaser which phases said received signal under control of said controller or said second detector so that said gain from said antenna array is largest in said desired directions, at least one demodulator which demodulates said signal, a combiner which combines said demodulated signals, a modulator which modulates said combined signal back to broadband, and a weighting phaser which weights and phases said modulated signal to correspond to said received signal.

12. The base station receiver according to claim 8, further comprising:

a phaser connected to said antenna array which analogically phases said received signal so that said gain obtained from said antenna array is largest in said desired beam-like directions, and that said second detector comprises at least one remover which removes said signal interfering with said desired signal from said received signal, at least one demodulator which demodulates said desired signal, at least one switch which connects said received signals with said desired antenna beams to said demodulator, and a combiner which combines said demodulated signals.

13. The base station receiver according to claim 12, wherein said second detector comprises at least one controller which controls said switch based on said received signal.

14. The base station receiver according to claim 7, further comprising:

a detector which simultaneously detects a plurality of signals arriving from the same direction; and a controller which guides, by said switching matrix, signals to be detected simultaneously to said second detector.

* * * * *

UNITED STATES PATENT AND TRADEMARK OFFICE
CERTIFICATE OF CORRECTION

PATENT NO. : 6,128,486
DATED : October 3, 2000
INVENTOR(S) : Keskitalo et al.

It is certified that error appears in the above-identified patent and that said Letters Patent is hereby corrected as shown below:

<u>Title page,</u>
Please change "[73] Assignee: Teknopolis Kolster Oy, Espoo, Finland" to -- [73] Assignee: Nokia Telecommunications Oy, Espoo, Finland --

Signed and Sealed this

Second Day of October, 2001

Attest:

*Nicholas P. Godici*

NICHOLAS P. GODICI
*Attesting Officer*   *Acting Director of the United States Patent and Trademark Office*